United States Patent [19]

Bahel et al.

[11] Patent Number: 5,303,561
[45] Date of Patent: Apr. 19, 1994

[54] CONTROL SYSTEM FOR HEAT PUMP HAVING HUMIDITY RESPONSIVE VARIABLE SPEED FAN

[75] Inventors: Vijay Bahel, Sidney; Hank Millet, Piqua; Mickey Hickey, Sidney; Hung Pham, Dayton; Gregory P. Herroon, Piqua, all of Ohio

[73] Assignee: Copeland Corporation, Sidney, Ohio

[21] Appl. No.: 961,139

[22] Filed: Oct. 14, 1992

[51] Int. Cl.$^5$ .................................. F25D 17/06
[52] U.S. Cl. ........................ 62/186; 62/160; 62/176.6
[58] Field of Search ............. 62/186, 160, 180, 177, 62/178, 179, 181, 183, 176.6, 176.1; 236/44 R, 44 C, 91 R, 91 C, 91 D

[56] References Cited
U.S. PATENT DOCUMENTS

| | | | |
|---|---|---|---|
| 3,998,068 | 12/1976 | Chirnside | 62/186 |
| 4,018,584 | 4/1977 | Mullen | 62/175 |
| 4,024,725 | 5/1977 | Uchida et al. | 62/176 E |
| 4,105,063 | 8/1978 | Bergt | 165/21 |
| 4,137,057 | 1/1979 | Piet et al. | 62/89 |
| 4,311,188 | 1/1982 | Kojima et al. | 236/91 D |
| 4,364,237 | 12/1982 | Cooper et al. | 62/181 X |
| 4,408,660 | 10/1983 | Sutoh et al. | 165/21 |
| 4,498,309 | 2/1985 | Kobayashi et al. | 62/186 |
| 4,512,161 | 4/1985 | Logan et al. | 62/176.6 |
| 4,684,060 | 8/1987 | Adams et al. | 236/11 |
| 4,745,766 | 5/1988 | Bahr | 62/176.6 |
| 4,852,363 | 8/1989 | Kampf et al. | 62/176.6 |
| 4,889,280 | 12/1989 | Graid et al. | 236/44 C |
| 4,899,551 | 2/1990 | Weintraub | 62/176.6 |
| 4,953,784 | 9/1990 | Yasufuku et al. | 236/44 A |
| 4,974,665 | 12/1990 | Zillner, Jr. | 165/21 |
| 4,984,433 | 1/1991 | Worthington | 62/176.6 X |
| 4,987,748 | 1/1991 | Meckler | 62/176.1 |
| 5,058,388 | 10/1991 | Shaw et al. | 62/176.6 X |
| 5,062,276 | 11/1991 | Dudley | 62/176.6 |
| 5,144,812 | 9/1992 | Mills, Jr. et al. | 62/186 |

*Primary Examiner*—Harry B. Tanner
*Attorney, Agent, or Firm*—Harness, Dickey & Pierce

[57] ABSTRACT

The microprocessor-based control system selects the appropriate indoor airflow (fan speed) to place the system in an optimal efficiency range. The indoor fan speed is further controlled based on humidity measurements, to produce a slower airflow when conditions are humid. This helps remove a greater amount of moisture from the air. Occupant comfort is enhanced by microprocessor control of the indoor fan speed to stay within the boundaries of the cooling mode comfort envelope.

3 Claims, 11 Drawing Sheets

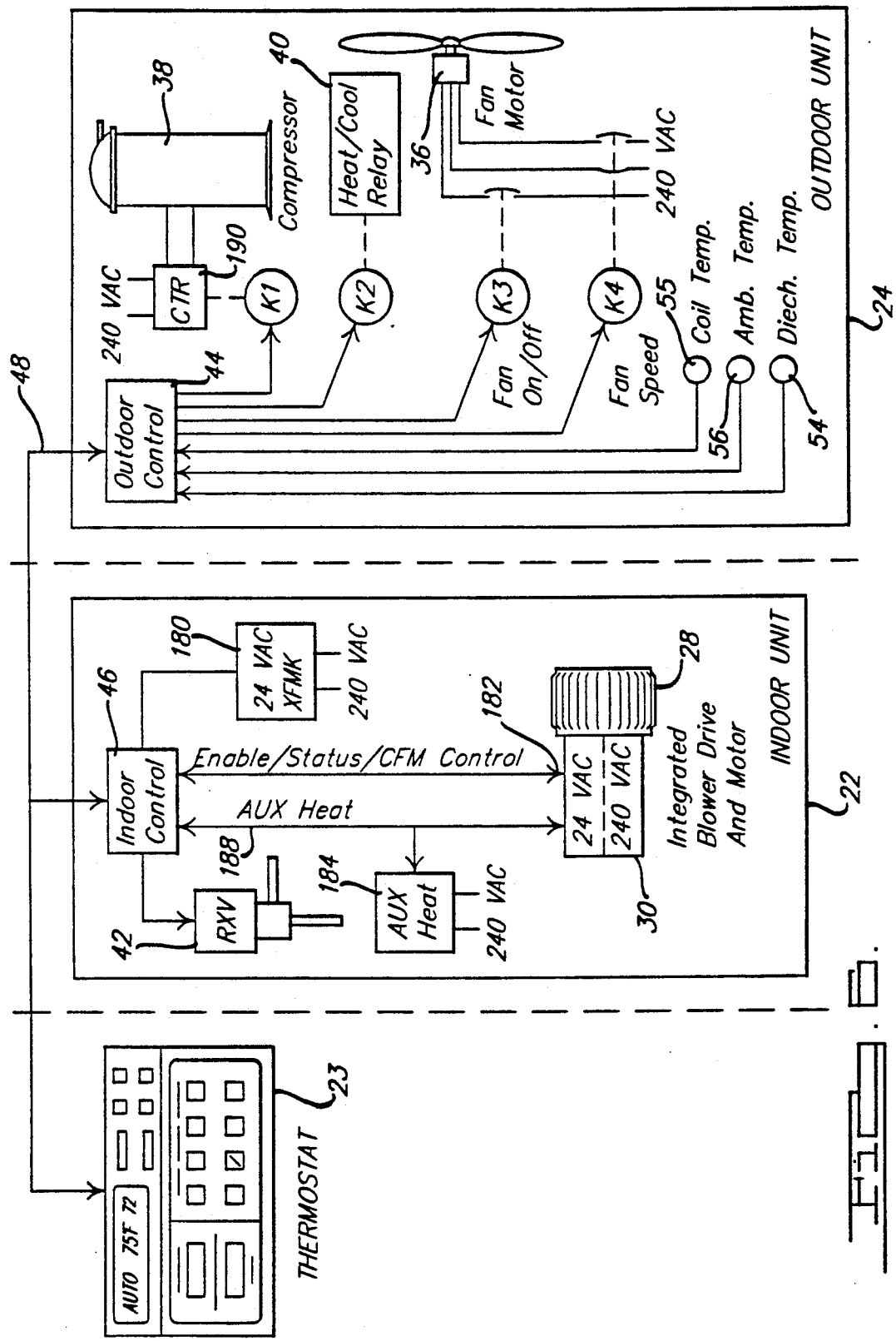

CONTROL SYSTEM FOR HEAT PUMP HAVING HUMIDITY RESPONSIVE VARIABLE SPEED FAN

BACKGROUND AND SUMMARY OF THE INVENTION

The present invention relates generally to electronic control systems for air conditioners, heat pumps and refrigeration equipment. More particularly, the invention relates to an apparatus and method using digital circuitry for controlling the speed of the indoor fan, based on environmental measurements, to optimize heating and cooling efficiencies and improve occupant comfort. The system modulates the indoor fan speed to stay within the comfort envelope defined by relative humidity and temperature measurements.

The heating and cooling industry has been striving for some time to improve the efficiency of air-conditioning and heat pump systems. System efficiency is a multifaceted concept, with a number of different ways of measuring and evaluating efficiency. Currently in the United States the parameters by which efficiency may be measured and evaluated are established by the Air-Conditioning and Refrigeration Institute (ARI). To allow different makes and models of air-conditioning and heat pump equipment to be compared for efficiency, ASHRAE has promulgated the efficiency measurement standard set forth in ARI 210-81. By those standards, for example, efficiency is measured at the unit's full rated output, i.e., with the unit operating at maximum heating or cooling effort. While this method of rating efficiency does allow units of different manufacturers to be compared on a somewhat common ground, in day to day operation, most heating and cooling equipment cannot be expected to operate continuously at full rated output. In fact, we have found that operating heating and cooling equipment at all times at full rated output actually degrades system efficiency. At many times during the day, and in some regions of the country at nearly all times, optimal efficiency is achieved at well below the maximum rated output. In these regions, energy could actually be saved if the heating and cooling equipment were scaled back to operate below peak output.

To do so, however, is not simply a matter of adjusting the thermostat up or down a few degrees, or scaling back the amount of refrigerant pumped through the system. Heating and cooling systems which have been designed to operate at optimum efficiency during full rated output will not necessarily operate at optimum efficiency when scaled back to less than full rated output. Optimal efficiency is ordinarily fine-tuned into the system during the design and manufacturing process, based on a wide variety of different physical and thermodynamic constraints which are not readily alterable after the system is built. Thus it has heretofore been impractical and uneconomical to provide heating and cooling systems with the ability to optimize efficiency over the normally encountered range of operating limits. Because ARI standards base efficiency ratings on full rated output, heating and cooling systems are understandably designed to provide optimum efficiency at full rated output. In this way the systems will compare favorably with their competition. The result, of course, is that systems, which rarely if ever need to operate at full rated output, rarely or never achieve optimal efficiency.

Compounding the efficiency problem is the issue of comfort. To a considerable extent, relative humidity affects comfort. When conditions are dry one feels comfortable at higher temperatures than when conditions are humid. In humid weather it is often necessary for the building occupant to lower the thermostat below the normal setting just to be comfortable. One benefit of air-conditioning systems is that they remove moisture from the air being cooled.

Surprisingly, however, many highly efficient air-conditioning systems remove less moisture from the air than older, less efficient ones do. This is due to the fact that a highly efficient air-conditioning system nominally operates at higher evaporator coil temperature, which removes less moisture from the air passing over it. The net effect is that sometimes a highly efficient air-condition system ends up consuming more power than an inefficient one, because the user may set the thermostat lower in order to feel comfortable. Present-day air-conditioning systems have not adequately addressed this problem.

The present invention addresses the above efficiency problem in a very effective and inexpensive way. The system employs a variable speed indoor fan which adjusts the airflow across the indoor coil or heat exchanger based on environmental measurements such as outdoor air temperature. The airflow rate across the indoor heat exchanger affects the rate at which heat is extracted (in the cooling mode) or injected (in the heating mode), which in turn affects the superheat within the refrigeration system. The microprocessor-based control system selects the appropriate indoor airflow (fan speed) to place the system in an optimal efficiency range.

The present invention addresses the humidity problem by controlling the speed of the indoor fan to cause a slower airflow when conditions are humid, in order to remove a greater amount of moisture from the air. More specifically, the microprocessor-based control system determines the indoor fan speed to stay within the boundaries of the cooling mode comfort envelope defined by the American Society of Heating and Refrigeration Engineers (ASHRAE), thereby correlating room temperature and humidity.

For a more complete understanding of the invention, its objects and advantages, reference may be had to the following specification and to the accompanying drawings.

BRIEF DESCRIPTION OF THE DRAWINGS

FIG. 6 is a block diagram of the presently preferred microprocessor based system;

DESCRIPTION OF THE PREFERRED EMBODIMENT

The present invention provides an apparatus and method for optimizing the refrigeration cycle employed in air conditioners, heat pumps and refrigeration equipment. The system employs a microprocessor-based control system with a unique complement of sensors and an electronically controlled stepper motor expansion valve to optimally control the system superheat. To illustrate the principles of the invention a heat pump system capable of providing both heating and cooling will be described. A heat pump system of the type described might be suitable for heating and cooling a commercial or residential building, although the principles of the invention are not limited to commercial and residential heating and cooling and are applicable to all pumped heat transfer systems.

Refrigeration Cycle Overview

Figure 1:
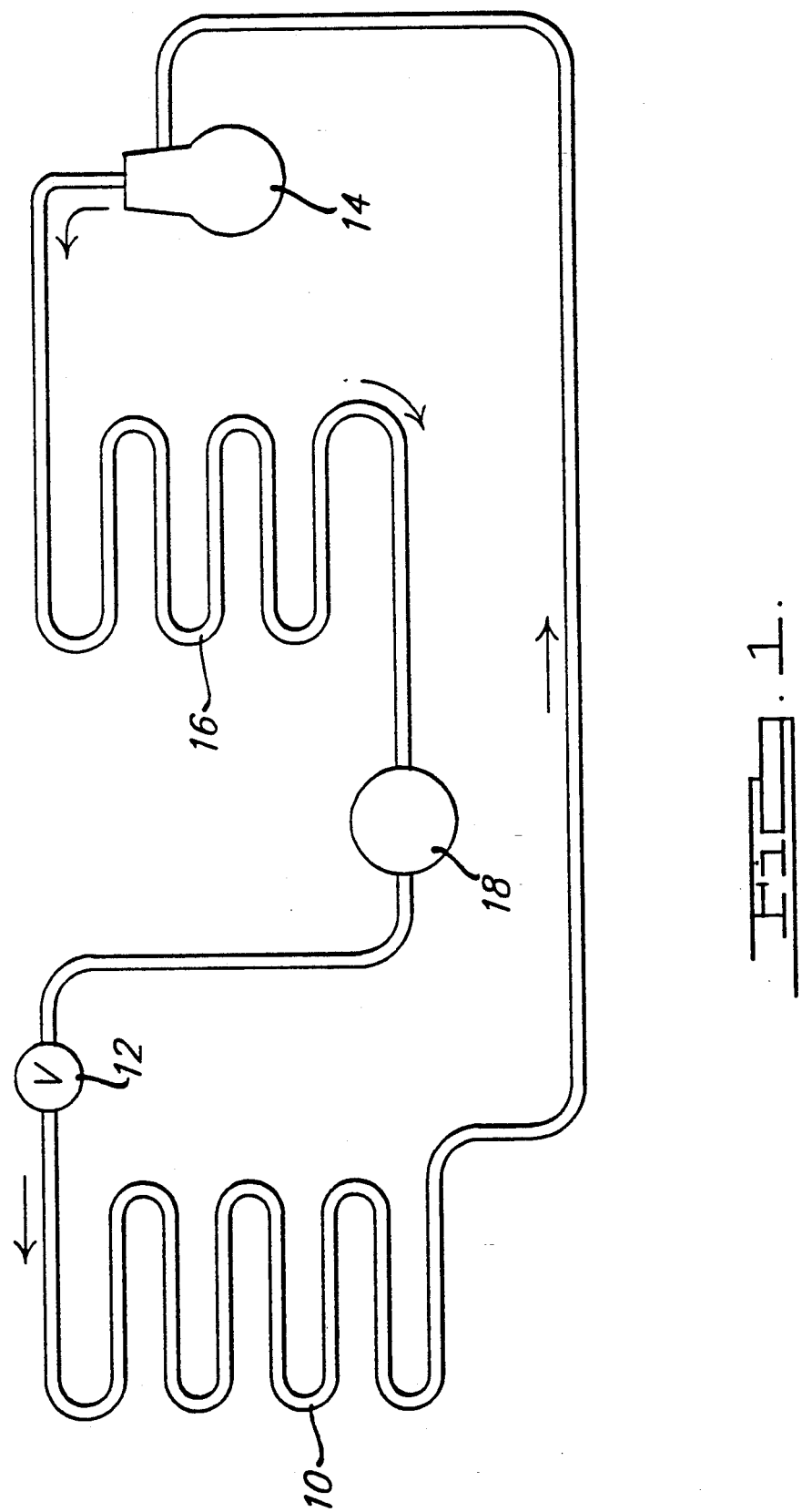
FIG. 1 is a schematic representation of the basic refrigeration cycle.

Before giving a detailed description of the presently preferred embodiment, a brief review of the refrigeration cycle will be given. That cycle will be described in connection with a basic cooling system illustrated schematically in FIG. 1.

Basically the refrigeration cycle uses the cooling effect of evaporation to lower the temperature or "aircondition" the surroundings. This is accomplished by releasing a refrigerant under pressure (usually in the liquid phase) into a low pressure region to cause the refrigerant to expand into a low temperature mixture of gas and liquid. This refrigerant mixture now in the evaporator coil 10 is exposed to the high temperature ambient air of the region desired to be cooled. Evaporation of liquid refrigerant to gas absorbs heat from circulating air and thereby cooling it. A fan or blower is often used to force the ambient air into more rapid contact with the cool evaporator coil to increase heat transfer. The refrigerant is able to evaporate or boil in the evaporator coil because of the lower pressure. In order to make the transition from the liquid to the gaseous phase the latent heat of vaporization must be added. This heat is, of course, extracted from the ambient air environment surrounding the evaporator coil.

The flow of refrigerant in the high pressure (liquid) state into the low pressure evaporator is usually metered by a restricted orifice or valve commonly called an expansion valve 12. There are a wide variety of different types of expansion devices in use today, ranging from simple nonadjustable capillary tubes to electrically adjustable valves such as pulse width modulated valves.

Were there an endless supply of refrigerant under pressure available to be expanded in the evaporator coil and if such refrigerant could then be safely exhausted to atmosphere, a refrigeration system would require only an evaporator coil in order to function. However, since there are few convenient sources of refrigerant under pressure which can be used and then exhausted to atmosphere, the basic refrigeration system also includes a recovery system which gathers the refrigerant at the outlet of the evaporator coil, compresses it back into a high pressure state and condenses it into a liquid phase to be used once again.

Thus the basic refrigeration cycle routes the gaseous refrigerant from the outlet of the evaporator coil to a compressor 14 which compresses the gaseous refrigerant, placing it at a substantially higher pressure, and raising its temperature. The high pressure, high temperature refrigerant, still in the gaseous phase, is then fed to a heat removal system where the high pressure refrigerant gas is allowed to condense into the liquid phase.

Ordinarily this heat removal system comprises another coil called the condenser coil 16. By locating the condenser coil in an ambient condition at a temperature lower than the temperature of the pressurized refrigerant, heat is extracted from the refrigerant, cooling it sufficiently to cause a transition to the liquid phase. From the outlet of the condenser coil, the liquid refrigerant may be stored in an optional liquid receiver tank 18 and thereafter recycled back to the expansion valve to begin the cycle once again.

The expansion of refrigerant from the liquid phase to the gaseous phase in the evaporator coil does not occur instantaneously. If one were to examine the interior of an evaporator coil 10 when the refrigeration cycle is operating, one would find at the inlet end (adjacent the expansion valve) some refrigerant would be in the gaseous phase and some would be in the liquid phase. As the refrigerant flows through the coil, more and more of the liquid will boil or evaporate into the gaseous phase, leaving less and less refrigerant in the liquid phase.

At some point (possibly within the coil or possibly beyond the coil outlet in the line leading to the compressor) the refrigerant will have finally completely evaporated to the gaseous phase. This point is called the dry out point. The dry out point is important because it marks the point at which the refrigerant can be elevated to a temperature above the saturation temperature or boiling temperature. This is called superheating.

To understand superheating one must recognize that in an enclosed system, such as in the evaporator coil, at constant pressure a boiling liquid will remain at a constant boiling temperature so long as there is some liquid remaining in the system. The boiling temperature is, of course, pressure dependent as dictated by thermodynamic laws. However, once all of the liquid refrigerant has boiled away, the gaseous refrigerant is now potentially able to absorb additional heat to increase in temperature above the boiling temperature.

When the gaseous refrigerant is in contact with liquid refrigerant, it is commonly said to be in the saturated state. In the saturated state the temperature of the gaseous refrigerant is the same as boiling temperature. Once all of the liquid has boiled away and if additional heat is added to elevate the temperature of the vapor above the boiling temperature, then the vapor is said to be superheated. The term superheat is used to denote the temperature difference between the vapor temperature and the saturation temperature (boiling point temperature).

By measuring the superheat of the refrigerant exiting the evaporator coil it is possible to acquire some understanding of how efficiently the refrigeration system is functioning. For example, if no superheat is achieved, then one can infer that the refrigerant is not fully evaporating in the evaporator coil. This, high concentration of liquid phase refrigerant in the outlet of the evaporator implies that liquid refrigerant could be fed to the compressor, a condition which greatly deteriorates compressor efficiency and can even cause compressor damage.

On the other hand, an excessively high superheat value implies that the evaporator coil could have accommodated more refrigerant, again an indicator of reduced efficiency. A design objective of a refrigeration control system is to meter precisely the right amount of refrigerant so that the entire length of the evaporator coil is used without flooding the coil with excessive refrigerant that may get passed to the compressor as liquid.

Heat Pump System

Having reviewed the basic principles of the refrigeration cycle, a presently preferred embodiment of the invention will be given. Although the invention can take many forms, it will be described in the heat pump system of FIG. 2.

Figure 2:
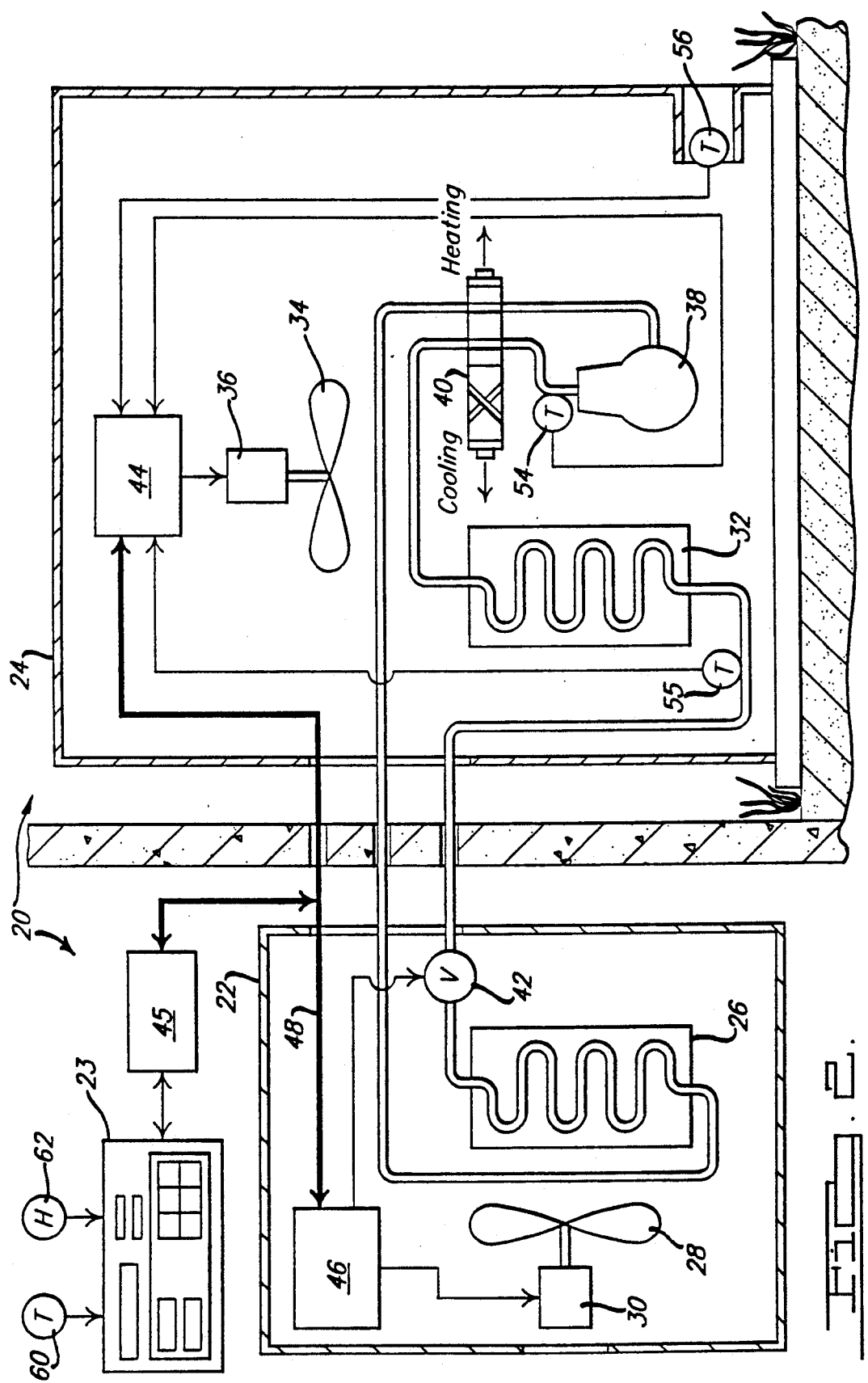
FIG. 2 is a schematic diagram of a preferred embodiment of the refrigeration control system of the invention, illustrated in a heat pump application.

With reference to FIG. 2, the heat pump system is depicted generally at 20. The system includes an indoor unit 22 and an outdoor unit 24. The indoor unit includes an indoor coil or heat exchanger 26 and an indoor fan 28. The indoor fan is preferably driven by a variable speed motor 30. The indoor fan and coil are enclosed in a suitable cabinet so that the fan forces ambient indoor air across the indoor coil at a rate determined by the speed of the variable speed motor.

The outdoor unit includes an outdoor coil or heat exchanger 32 and an outdoor fan 34 driven by suitable motor 36. Preferably the outdoor unit comprises a protective housing which encases the outdoor coil and outdoor fan so that the fan will draw ambient outdoor air across the outdoor coil to improve heat transfer. The outdoor unit also houses compressor 38.

The system illustrated in FIG. 2 is a so-called "heat pump" system because it can be used for both cooling and heating, by simply reversing the function of the indoor coil and the outdoor coil. This is done with a four-way reversing valve 40. Referring to FIG. 2, when the four-way valve is set to the COOLING position (shown), the indoor coil functions as the evaporator coil and the outdoor coil functions as the condenser coil. When the four-way valve is switched to the HEATING position (the alternate position), the function of the coils is reversed. The indoor coil functions as the condenser and the outdoor coil functions as the evaporator.

In addition to the indoor and outdoor coils and the compressor, the present system also uses an electronically controllable expansion valve 42. In the presently preferred embodiment the expansion valve is a continuously variable (or incrementally variable) stepper motor valve which can be adjusted electronically to a wide range of orifice sizes or valve openings, ranging from fully open to fully closed. Although it is possible to implement the control system of the invention with other types of electrically controlled valves, pulse width modulated valves being an example, the present embodiment prefers the stepper motor valve because it provides ripple-free operation. The stepper motor valve only needs to move or cycle when an orifice size adjustment is made. This may happen several times during a typical operating sequence (e.g., several times per hour). In contrast, the pulse width modulated valve cycles continuously during the entire operating sequence.

Details of Microprocessor-Based Hardware and Software

For convenience, the microprocessor-based control system used in implementing the refrigeration system of FIG. 2 is shown in FIG. 6. Specifically, the indoor unit 22, room unit or thermostat unit 23 and outdoor unit 24 are interconnected by communication link 48. Preferably communication link 48 is a four wire bus supplying AC power and ground to all three units and also providing a pair of serial communication data lines. The indoor unit 22, room unit 23 and outdoor unit 24 each have a microprocessor-based control unit which communicates with the other units over the communication link. In FIG. 6 the microprocessor-based control units 44 and 46 have thus been illustrated. The room unit 23 may also include a microprocessor-based control unit. The details have been omitted from FIG. 6 to simplify the illustration.

Also associated with the indoor unit 22 is the indoor fan or blower 28, which includes an integrated drive and variable speed motor 30. The presently preferred embodiment uses a motor which requires 240 VAC. Control signals and logic signals sent via communication link 48 are at 24 VAC and 5 VDC. A step-down transformer 180 is provided on the indoor unit for this purpose. Motor 30 receives its operating control instructions from and supplies status signals to the indoor control unit 46 at 24 VAC line levels over motor communication path 182.

The presently preferred embodiment uses electric resistance heaters to supply auxiliary heat. Indoor control unit 46 is responsible for determining when to turn the auxiliary heat on and off. This signal is supplied at 24 VAC logic levels. The indoor control unit 46 also supplies 24 VAC logic signals to control the expansion valve 42.

The outdoor unit also supplies and receives a number of different control signals at 24 VAC logic levels via the paths illustrated. For example, outdoor control unit 44 supplies the ON/OFF signal to compressor relay K1. This relay in turn energizes the compressor controller 190. The outdoor control unit 44 similarly supplies ON/OFF control signals to the heat/cool relay K2, which switches the reversing valve 40 as described above to place the system in either the HEATING or COOLING mode. The outdoor control unit supplies logic signals to the fan ON/OFF relay K3 and the fan speed relay K4. These relays in turn control the outdoor fan motor 36. In the presently preferred embodiment the outdoor fan motor 36 is a two speed motor. Outdoor control unit 44 also receives logic level data from the outdoor sensors, such as first temperature sensor 54, which measures the discharge temperature of the compressor, second temperature sensor 56, which measures the ambient or environment air temperature and coil temperature sensor 55, which measures the temperature of outdoor coil 32 (FIG. 2).

Figure 7:
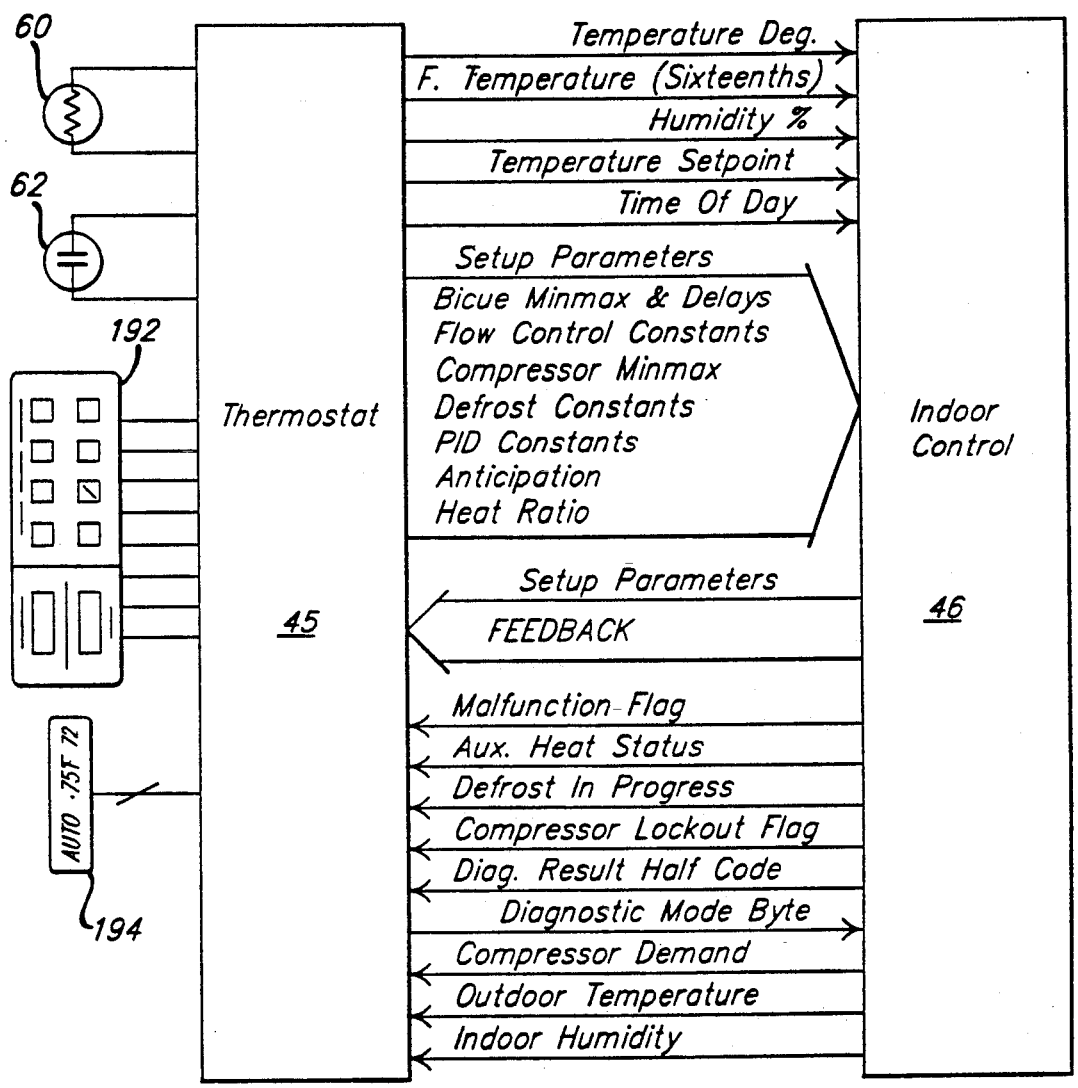
FIG. 7 is a block diagram showing data flow between room unit (thermostat) and indoor unit.
Figure 8:
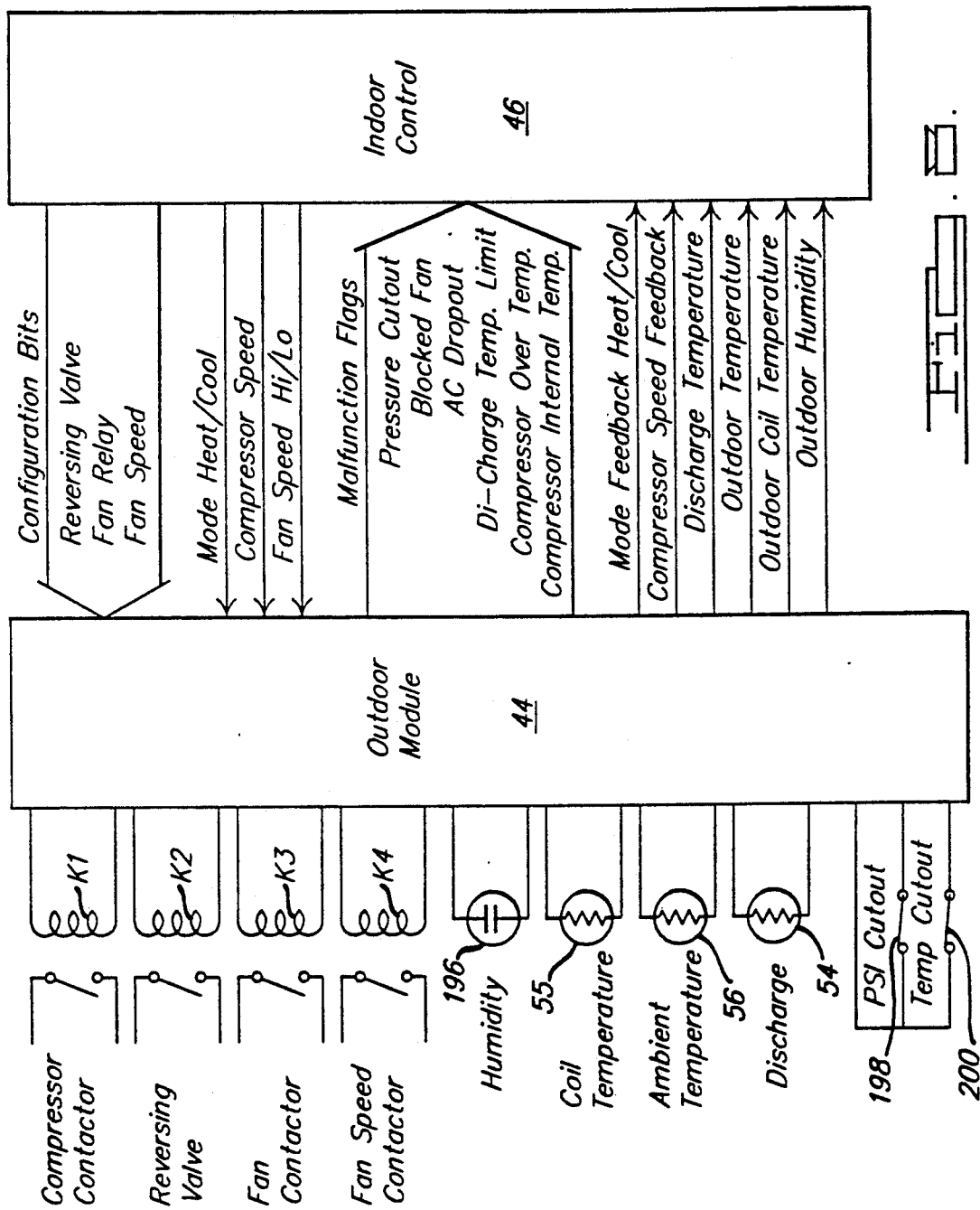
FIG. 8 is a block diagram showing data flow between indoor unit and outdoor unit.

Referring to FIGS. 7 and 8, the microprocessor-based control units 44, 45 and 46 are shown in somewhat greater detail to show the types of signals which are communicated between the units during operation. In FIG. 7 the room unit control unit 45 is shown together with its associated keypad 192 and display 194. The keypad is coupled to the room unit control unit 45 via an eight line parallel data bus. The display is similarly coupled via a 36 line parallel data bus. Note the indoor temperature sensor 60 and indoor humidity sensor 62 are also coupled to the room unit control unit 45. Note, also that a humidity sensor 196 may also be employed in the outdoor unit (see FIG. 8) so that outdoor humidity can be measured. To protect the outdoor unit, a pressure cutout 198 and a temperature cutout 200 are provided.

In reviewing FIGS. 7 and 8 it should be kept in mind that the presently preferred interunit communication is done via the serial communication link 48. It is the nature of serial communication that the communication line is shared by all units and thus only one message is communicated at a time. Thus in FIGS. 7 and 8, the itemized data flow between room unit control unit 45 and indoor control unit 46 and between outdoor control unit 44 and indoor control unit 46 are shown to illustrate the type of information which is passed back and forth during system operation. Although FIGS. 7 and 8 illustrate this transfer of data as a parallel operation, and it could be implemented in a parallel communication link, the present embodiment prefers a serial link. To transfer this much information back and forth during system operation the microprocessor-based systems send and acknowledge messages in a serial fashion according to a predefined protocol. Each of the three units has sufficient random access memory, and in some cases nonvolatile memory, in which to store the various parameters which comprise the information communicated between them. Thus, for example, the outdoor humidity measured by sensor 196 is stored in the random access memory of outdoor control unit 44, to be thereafter communicated to indoor control unit 46 where it is stored in the random access memory of control unit 46. Thereafter, the same outdoor humidity data may be communicated to the room unit where it is stored in the room unit control unit's random access memory. The building occupant could then, if desired, enter the appropriate keypad function to request a display of the outdoor humidity. This is but one example of how data flows from module to module. By using interim storage in each of the modules, each module is able to handle its own system critical tasks with high priority, attending to the noncritical tasks only when there is time. Thus the building occupant requesting a display of outdoor humidity would not cause the outdoor module to neglect its task of controlling the compressor and likewise would not cause the indoor unit to neglect its task of regulating the fan speed. The building occupant requesting and outdoor humidity display would see a humidity value displayed instantly, although the value displayed would be the value obtained during the most recent data refresh sequence.

Tables I and II below illustrate the presently preferred communication protocol by which the three control units communicate. Communication between the indoor control unit and room control unit comprise a series of status requests and status replies and parameter requests and parameter replies. Similarly, communication between the indoor control unit and the outdoor control unit comprise a series of command updates, status requests and status replies. The information given in Table I is of a general nature, showing the basic handshaking protocol employed. The protocol is implemented by a series of messages back and forth between the various units. Table II gives greater detail about the presently preferred message format. Tables I and II may be read together using the key numbers appearing in circles on both Tables. Thus a status request from the indoor control unit to the room control unit (designated by the key number ①) can be readily found in both Tables. Thus the Status Request message ① is found in both Table I and Table II. Table II gives the presently preferred message format sequence used to identify a Status Request message. From Table II the Status Request message from indoor control unit to room control unit is 81 194 19. This is a fairly short message. Other messages, such as a Status Reply ② are considerably longer and convey considerably more information.

With reference to Table II it will be seen that some messages, such as those with key numbers ①, ④, ⑤ and ⑧ are simple messages which do not convey data. The remaining messages are more complex since they convey numerical data. These more complex messages each being with two byte header (e.g., message ① begins with the bytes 81 194) used to identify the type of message and its intended recipient. In addition, these more complex messages also end in a single byte check sum (e.g. message ③ ends in check sum 223). The bytes between the header and the check sum comprise numerical data that is being transferred by the message. In Table III a brief description of each byte of data is given. For example, in message ② the humidity set point is indicated at 80, the humidity percent is indicated at 70, and so forth. Table III defines the abbreviations used in Table II. The numerical data values shown in Table II are merely exemplary of typical operating data. Different numerical data may obtain during system operation.

Some of the message bytes in Table II have been designated as FLAG data. These data typically comprise ON/OFF or TRUE/FALSE Boolean data capable of being conveyed by binary numbers. To save storage space and shorten communication time, these Boolean data are combined on a bitwise level into the various FLAG bytes. For example, in message ②, the FLAG bit in the bit 7 column designates whether manual mode or normal mode is invoked. Bit 6 conveys whether the system is in power-up mode or key press mode. Bit 3 tells whether the blower is on or off. Reference may be had to Table III for the abbreviations used in describing these FLAG bits.

Figure 9:
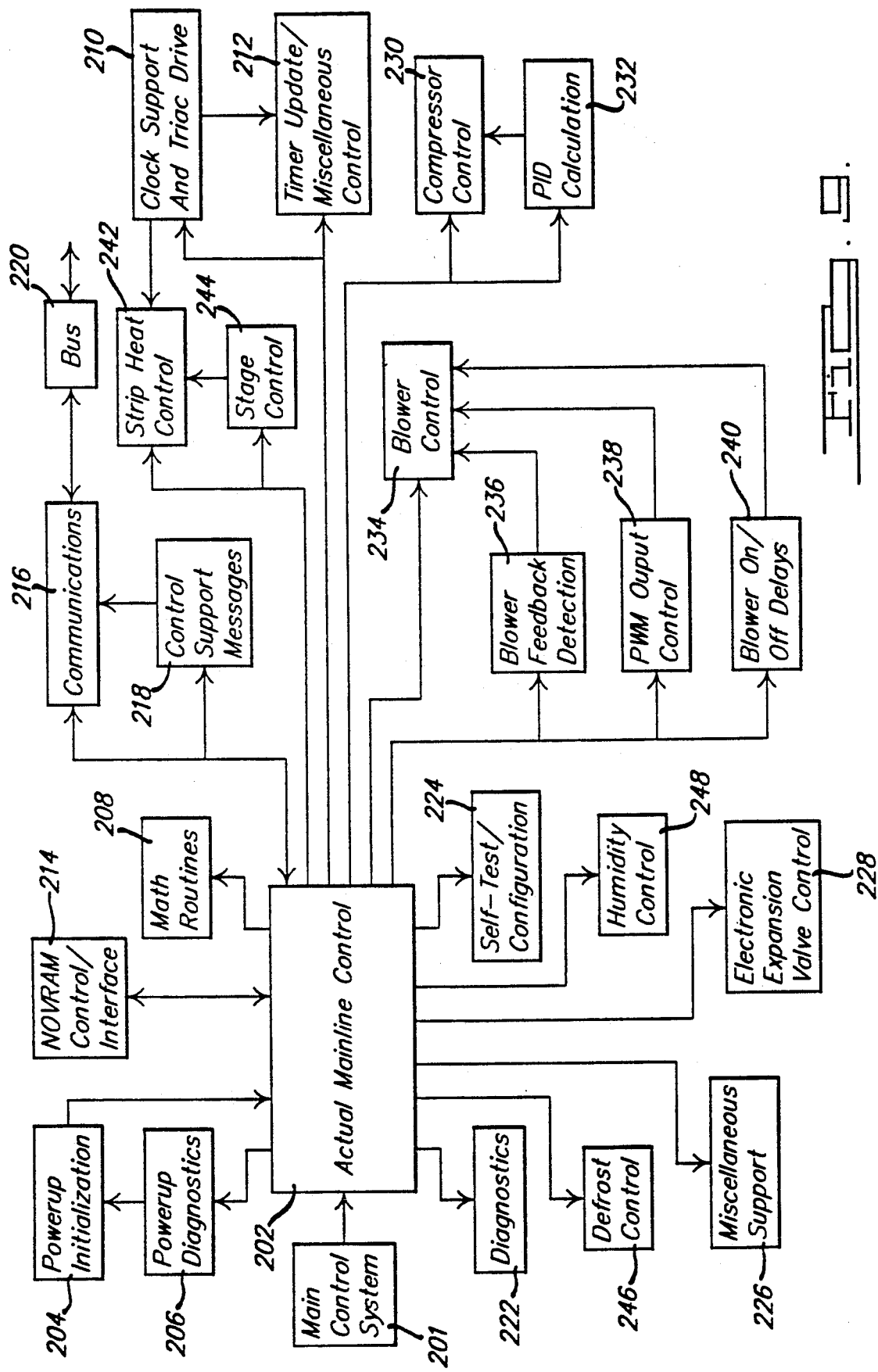
FIG. 9 is a software block diagram of the preferred software embodiment.

The indoor control unit 46 functions as the master, controlling the overall system performance and much of the communication among the three control units. FIG. 9 is a software block diagram illustrating the functional software elements which comprise the present control system. Because the indoor control unit functions as the master in the presently preferred embodiment, many of the software modules of FIG. 9 reside in and are performed by the indoor control unit 46. Of course, from a system standpoint, any one of the microprocessor-based modules could serve as the master. In addition, the software functions depicted in FIG. 9 could be distributed across or shared by all three control units. Thus the specific allocation of certain functions to certain ones of the control units adopted by the present embodiment should not be viewed as a limitation upon the scope of the claims.

Referring to FIG. 9, at the heart of the software control system is the mainline control block 202. This block or module interfaces, either directly or indirectly, with each of the remaining blocks or modules. The mainline block 202 is supervised by the main control system block 201, which supplies the global system performance requirements. The mainline control block is responsible for effectuating the instructions of the main control system by interfacing with the other modules. For example, the power up initialization and power up diagnostics blocks are called by the mainline control block during initial power up. The mainline control block has access to a math routines block 208 which is called upon anytime math calculations take place. Similarly, mainline control block 202 has access to the clock support and triac drive block 210 and the timer update/miscellaneous control block 212, which are used anywhere timing of events is involved.

The system is adaptive, in that it is capable of continuously updating parameters during normal operation. At initial power up, however, the system uses preset starting parameters which are stored in a nonvolatile RAM or NOVRAM memory that is accessed via the NOVRAM control/interface block 214. The nonvolatile RAM may also store other numerical values such as constants which are not ordinarily altered during system operation. The use of nonvolatile RAM for this purpose is quite advantageous, since it allows a standardized hardware system to be custom programmed in the factory before shipment. This allows a more or less standard control module package to be used for a wide range of different heating and cooling systems by simple in factory programming. This results in a considerable cost savings.

Communications and message handling is provided by the communications block 216 and the control support messages block 218. These blocks implement the communication protocol described in Tables I-III. The actual details regarding the manner in which messages are placed on the communication link are handled by the bus block 220. System diagnostics are performed by block 222. If desired, the system may be programmed to perform self-tests and self-configuration. This is performed by block 224. In addition, any miscellaneous support functions which do not fit the other described categories may be called by the mainline control block. For illustration purposes, the miscellaneous support block 226 is thus shown.

Mainline control block 202 is further responsible for the important functions of controlling the refrigeration system components, the indoor fan and any auxiliary heating equipment. With respect to the refrigeration system components, an electronic expansion valve control block 228 is provided. This block is responsible for determining and effecting the setting of the expansion valve. Similarly, the compressor control block 230 is provided for turning the compressor on and off via relay K1. A PID algorithm implemented in block 232 provides the adaptive control by which the system updates it parameters during operation.

Regarding the fan speed control, the blower control block 234 receives instructions from blower feedback detection block 236, pulse width modulation output control block 238 and blower ON/OFF delay block 240. The presently preferred indoor fan motor is driven by a pulse width modulation system by which the pulse width of the motor drive signal is varied to modulate the speed. The pulse width modulation output control block 238 and blower feedback detection block 236 provide the pulse width modulated closed-loop system function. The blower ON/OFF delay block 240 alters the ON/OFF sequence of the indoor fan to optimize airflow in relation to the temperature of the heat exchanging elements.

In systems which use auxiliary heat, such as resistance heating elements, the strip heat control block 242 and stage control block 244 are provided. The strip heat control block is responsible essentially for activating one or more relays to turn on the auxiliary heating elements. The stage control block causes the strip heat control block to do so in stages based on the desired temperature and how much heat is required.

The presently preferred embodiment uses a demand defrost cycle to periodically melt accumulated frost on the coil. This is handled by the defrost control block 246. In addition, fan speed may be regulated to control humidity or to maintain system operation within the ASHRAE comfort zone. This is handled by the humidity control block 248.

As described above presently preferred control system is a microprocessor-based system which gathers data from various sensors and which determines the proper setting of the expansion valve based on the data gathered. More specifically, the presently preferred embodiment uses two microprocessor-based control units 46 and 44, one associated with the indoor unit and one associated with the outdoor unit, respectively. In addition, the room unit or thermostat unit 23 may also include a microprocessor-based control unit 45. Preferably, all three microprocessor-based control units are linked together via a suitable communication link 48 such as a parallel or serial communication link. The outdoor control unit 44 is largely responsible for data collection while the indoor control unit 46 is responsible for: on/off cycling of system, modulating the indoor fan speed, control of expansion valve, start/termination of demand defrost malfunction detection and performing system.

Figure 3:
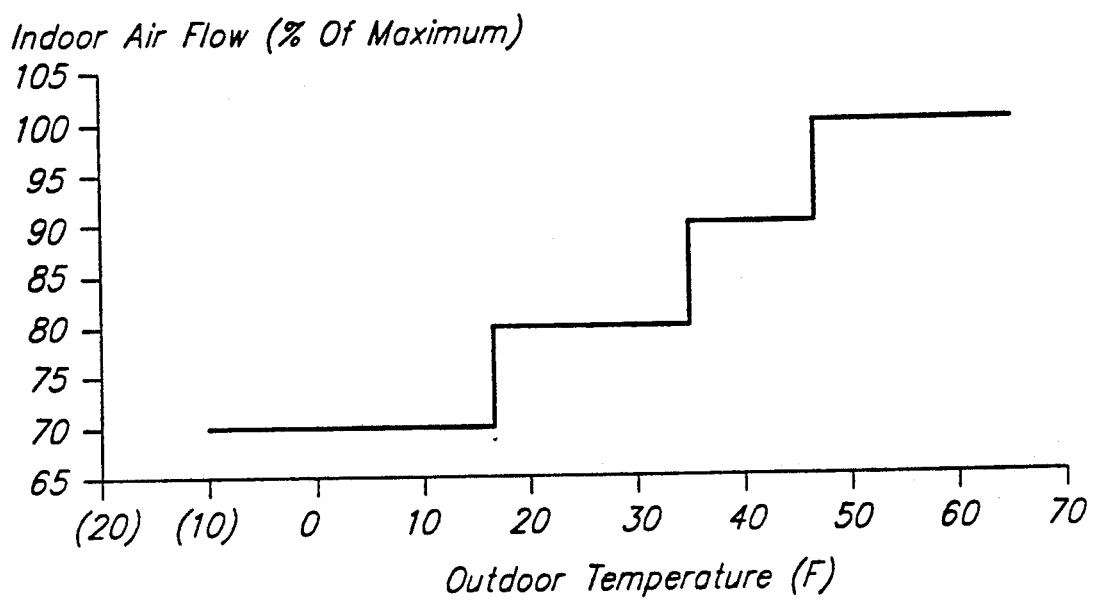
FIG. 3 is a graph depicting the relationship between indoor airflow as a percent of maximum and outdoor temperature in the HEATING mode.
Figure 4:
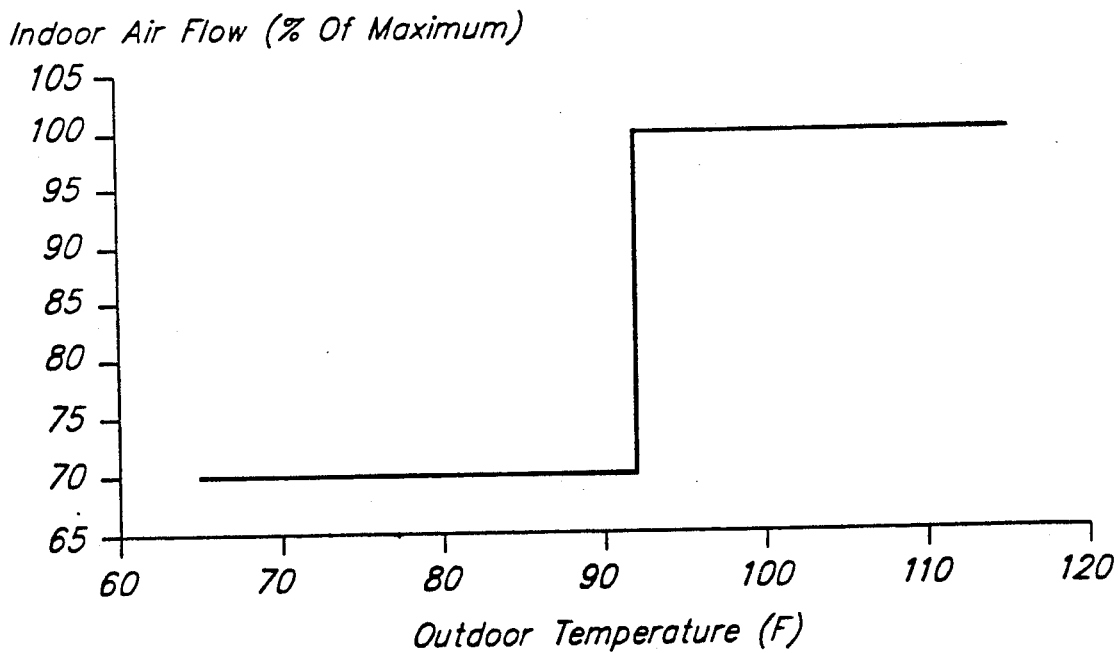
FIG. 4 is a graph depicting the relationship between indoor airflow as a percent of maximum and outdoor temperature in the COOLING mode.

More specifically, microprocessor 46 modulates the indoor fan speed differently, depending on whether the system is operating in HEATING mode or in COOLING mode. In both cases the indoor fan speed is controlled as a function of outdoor temperature. In the HEATING mode the fan speed is varied over a range of 70% to 100% in four steps depicted in FIG. 3. In the cooling mode fan speed is varied from 70% to 100% in two steps, as shown in FIG. 4. Of course, it is to be understood that the presently preferred airflow-temperature relationships, depicted in FIGS. 3 and 4, may be varied without departing from the spirit of the invention. Essentially, the indoor airflow is modulated based on outdoor air temperture to achieve optimum heating and cooling efficiencies.

Figure 11:
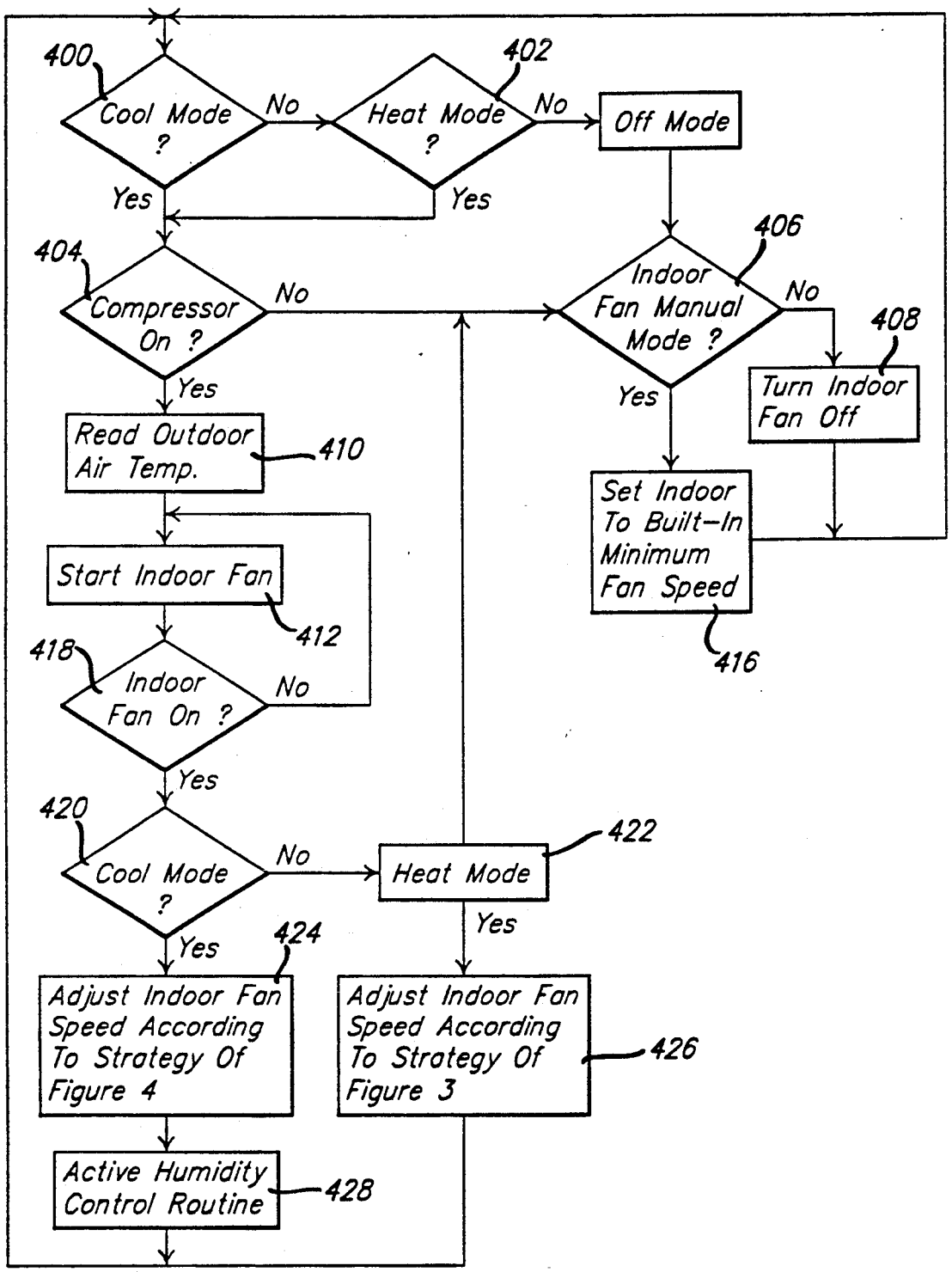

Referring to FIG. 11, the indoor airflow is modulated according to an algorithm which distinguishes between the HEATING mode and the COOLING mode. If the system is in either the COOLING mode or in the HEATING mode, a check is performed at Step 404 to determine whether the compressor is running. If not, and if the indoor fan has not been set to manual mode (Step 406), then the indoor fan will be turned off as indicated at Step 408. If the indoor fan has been set to manual mode, then the indoor fan will be commanded to operate at the built-in minimum speed as indicated at Step 416.

If the compressor is on, the outdoor air temperature is read at Step 410 and the indoor fan is started at Step 412. A test is performed at Step 418 to ensure that the fan is on. Thereafter, if the system is in the COOLING mode, the indoor fan speed is adjusted according to the strategy of FIG. 4. See Step 424. Alternatively, if the system is in the HEATING mode, the indoor fan speed is adjusted according to the strategy of FIG. 3. See Step 426. As previously described, the strategy of FIG. 4 is a stepwise function comprising a first step calling for a 70% airflow at temperatures below approximately 92° and calling for an airflow of 100% at temperatures above approximately 92°. The strategy of FIG. 3 is also a stepwise function calling for four steps as illustrated. In addition to the stepwise control of fan speed, the presently preferred system also employs an active humidity control routine 428. Preferably this routine is applied only during the COOLING mode. It is described below in connection with FIG. 10.

The reduction of fan speed from 100% to 70% saves a considerably amount of energy without substantially sacrificing cooling capacity. The electrical motor driving the indoor fan follows the cubic law. That is, when the motor speed is reduced by half, the motor power consumed is reduced by a factor of eight. Similarly, when the motor speed is reduced by 70% the power consumed is reduced to about 35% of full load power. To illustrate, if the fan motor draws 500 watts of power at full load, it will draw in the neighborhood of 171 watts when the speed is reduced to 70%. This represents a significant energy savings. Along the same lines, if the speed if further reduced to 50%, the motor would draw approximately 62 watts of power. Due to the cubic law relationship, the reduction in motor speed from 100% to 70% drops power consumption from 500 watts to about 170 watts. This represents a savings of 330 watts or about one-third of a kilowatt every hour the fan is in operation. A reduction of motor speed to 50% results in additional energy savings, but not as much as the savings afforded by the drop to 70%. That is, a reduction from 70% down to 50% will result in an additional savings of roughly 110 watts. Because of these diminishing returns, the presently preferred embodiment employs a 70% speed reduction as representing a reasonable comprimise between energy savings and reduced airflow. Although the 70% reduction factor is presently preferred, it is possible to implement the invention using other reduction factors.

Figure 5A:
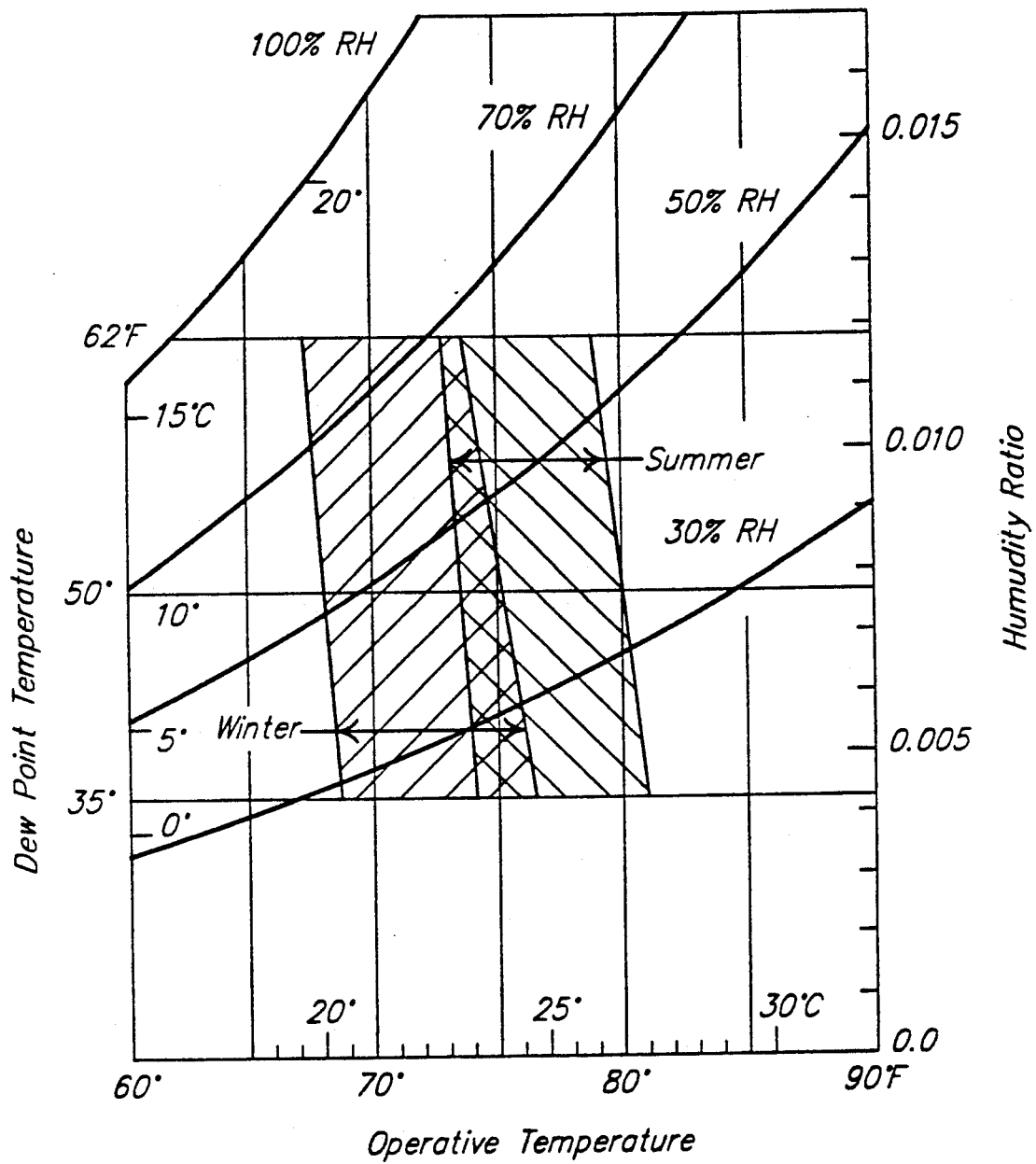
FIGS. 5a and 5b are graphs depicting the temperature-humidity comfort envelope.

As depicted in FIG. 2, the room unit microprocessor 45 or thermostat module may include an indoor temperature sensor 60 and an indoor humidity sensor 62. The indoor temperature and humidity data are transferred to indoor microprocessor 46. The indoor temperature and humidity data is used to further control the indoor fan speed in order to stay within the boundaries of the ASHRAE comfort envelope to enhance the occupant comfort. Referring to FIG. 5, the comfort envelope demonstrates how perceived temperature is a function of not only actual temperature but also humidity. For example, at 80% relative humidity, 75° actual room temperature feels like 78°. Because of this phenomenon, on humid days building occupants may have to lower the thermostat to feel comfortable. This, of course, raises utility bills, since more energy must be expended to achieve the lower temperature setting.

The present invention addresses the problem at its source. It has been found that highly efficient air-conditioning systems nominally operate at higher evaporator coil temperatures and therefore remove less moisture from the air. The present invention interactively compensates for this by modulating the indoor fan speed based on humidity. More specifically, the temperature and humidity sensors are located in the room unit or thermostat unit. They are used to modulate the indoor fan speed in such a way that the indoor temperature and relative humidity move within the Comfort Envelope defined by the American Society of Heating and Refrigeration Engineers. See FIG. 5a. The principle elements of the fan speed modulation alogrithm or mechanism are shown in FIG. 10.

Figure 5B:
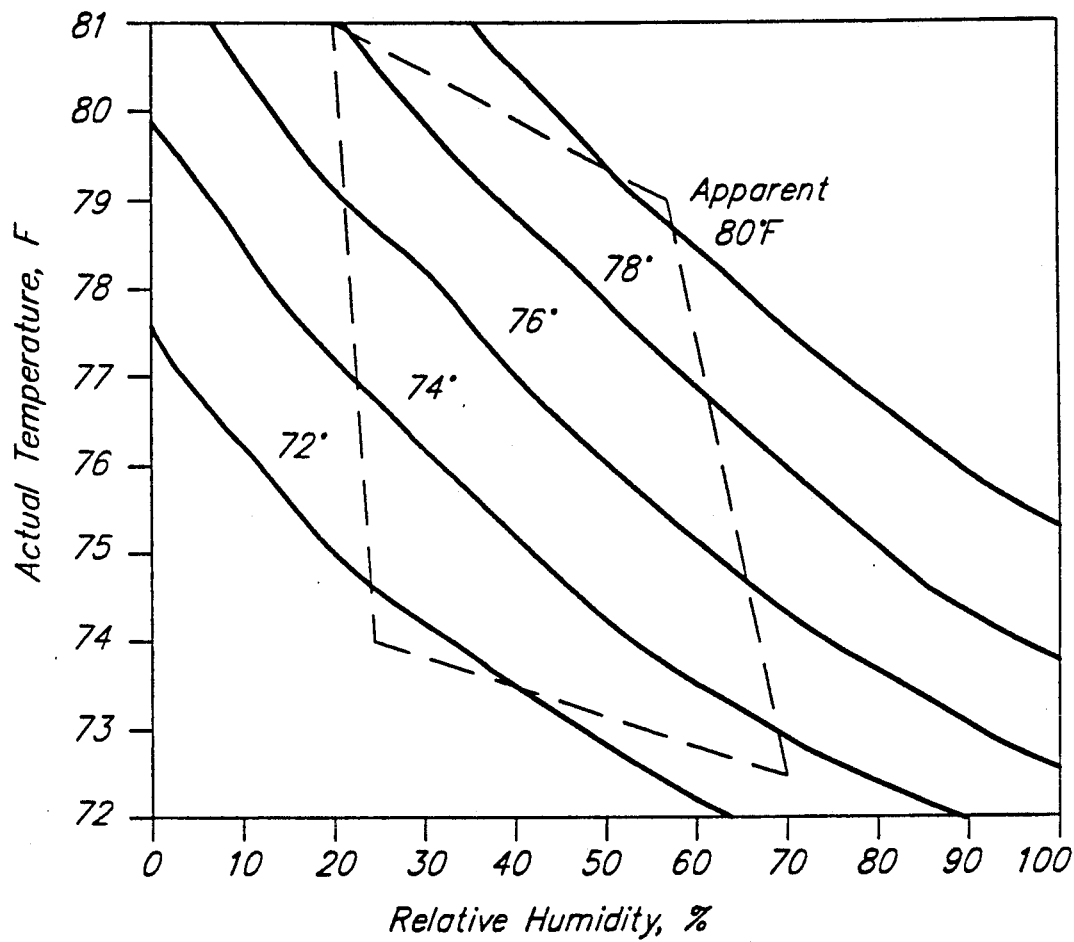
Figure 10:
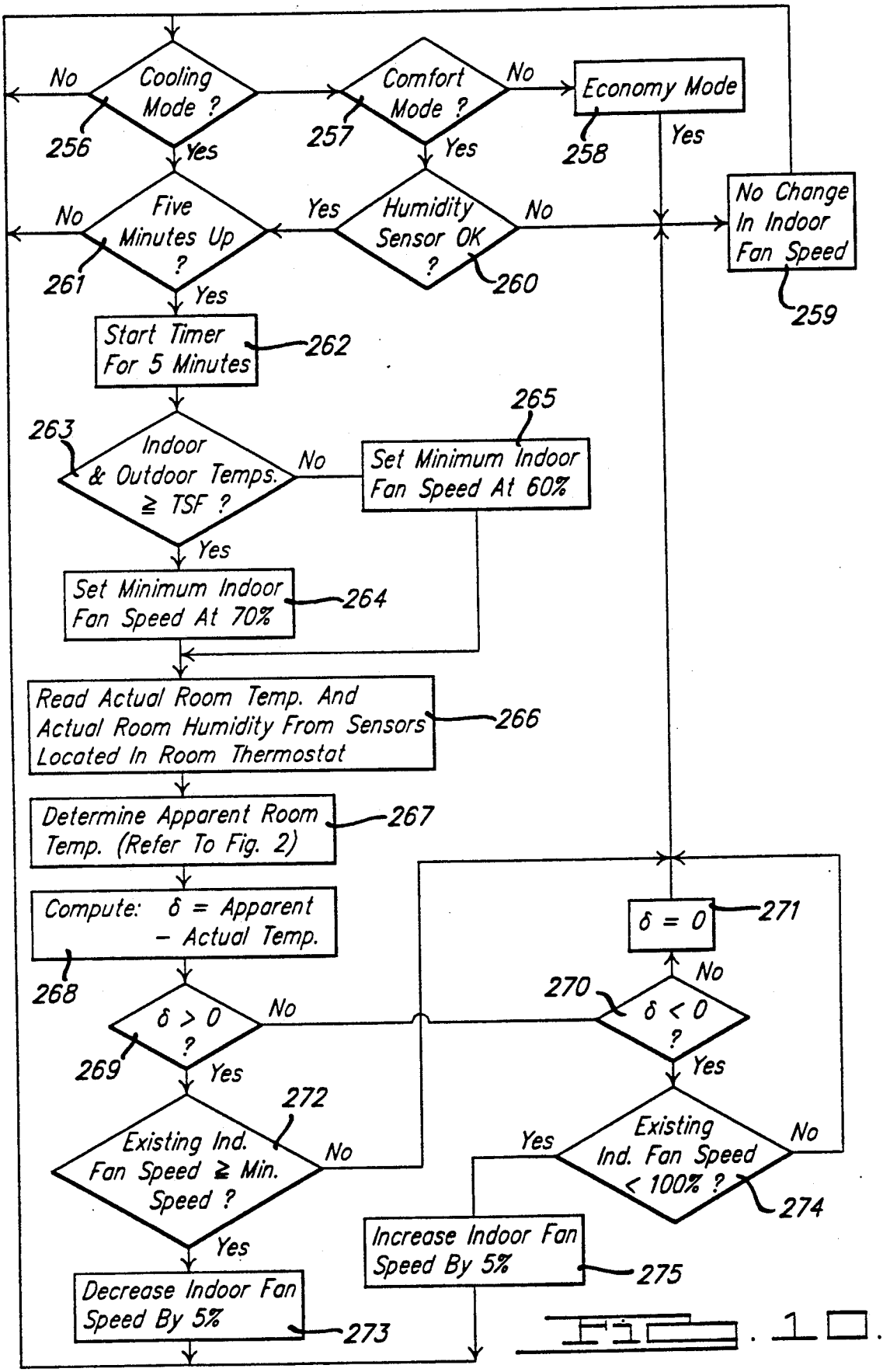
FIGS. 10 and 11 are flowchart diagrams illustrating the presently preferred manner of controlling indoor airflow.

Referring to FIG. 10, active humidity control is accomplished by using the measured indoor temperature and humidity to compute the difference between the actual temperature and the apparent temperature based on the moisture content or humidity within the room. This difference is used to modulate the indoor airflow so that the system's moisture removal capability is altered. The relationship between the apparent temperature, the actual temperature and the relative humidity is shown in FIG. 5b. In the presently preferred embodiment, the indoor fan motor speed is not allowed to fall below 60% of the maximum speed whenever the indoor and outdoor temperatures are less than 75°. This is the case even if the apparent indoor temperature is outside the Comfort Envelope. This is done to protect the indoor coil from freezing.

Referring to FIG. 10, after determining which mode the system is in Steps 256 through 259, a five minute timed loop is entered at Step 261 and 262. During this five minute interval the fan speed alogrithm is performed. First, at Step 263, if the indoor temperture and outdoor temperature are less than 75°, the minimum fan speed is set at 60% as indicated at Step 265. Otherwise, the minimum fan speed is set at 70% as indicated at Step 264.

Thereafter, the actual room temperature and actual room humidity are determined from the indoor sensors at Step 266 and the apparent room temperature is deteremined at Step 267. This may be done by employing a look up table or other suitable calculation. The difference between actual temperature and apparent temperature is computed at Step 268 and this difference temperature is used to set the fan speed. As illustrated at Steps 269, 270 and 271, if the difference is greater than zero the fan speed is decreased by a factor of 5%. If the difference is less than zero the fan speed is increased by a factor of 5% unless the existing fan speed is already at the maximum 100%.

Thus the fan speed is adjusted up or down in increments, preferably in 5% increments. The speed increments or decrements are performed once during the five minute interval.

Modulation of the fan speed actually helps control the humidity within the room. A reduction in indoor fan speed (resulting in a lower indoor air flow) lowers the indoor coil temperature. This enhances the moisture removal function of the system during high indoor humidity conditions by causing a given volume of indoor air to spend a longer time in contact with the moisture removing indoor coil. Conversely, a higher indoor fan speed improves the heat transfer, thus raising the indoor coil temperature (resulting in a higher dew point temperature of the coil). This reduces the moisture removing capability of the coil, resulting in a higher indoor relative humidity.

Thus, the indoor fan speed is used to modify the indoor relative humidity both during the high and during the low room humidity conditions. This improves occupant comfort. This comfort mode is invoked by the operator selecting the "Comfort Mode" on the thermostat controller. If this feature is not desired the occupant can select the "Economy Mode" which will bypass or defeat the active humidity control logic.

If the humidity can be brought within the bounds of the Comfort Envelope by the above-described technique, the control system will control the temperature to the set point dictated by the thermostat setting. If, however, the humidity is outside of the Comfort Envelope the control system will attempt to achieve an apparent temperature comparable in comfort to the thermostat set point temperature at a 50% relative humidity.

From the foregoing, it will be seen that the present invention represents a significant departure from conventional refrigeration cycle control techniques. The microprocessor-based control system and digitally controlled humidity-responsive variable speed fan of the invention greatly improve steady state and cyclic performance and comfort, by optimizing the indoor fan speed in a controlled way. Energy is saved by allowing the system to operate at optimal efficiency even at below rated output and by allowing building occupants to feel comfortable at higher cooling temperature settings.

While the invention has been described with respect to a presently preferred heat pump embodiment, it will be understood that the invention can be applied to numerous forms of air conditioning systems and refrigeration systems. Accordingly, the principles of the invention are not limited to the embodiment described. The invention is capable of certain modification and change without departing from the spirit of the invention as set forth in the appended claims.

TABLE I

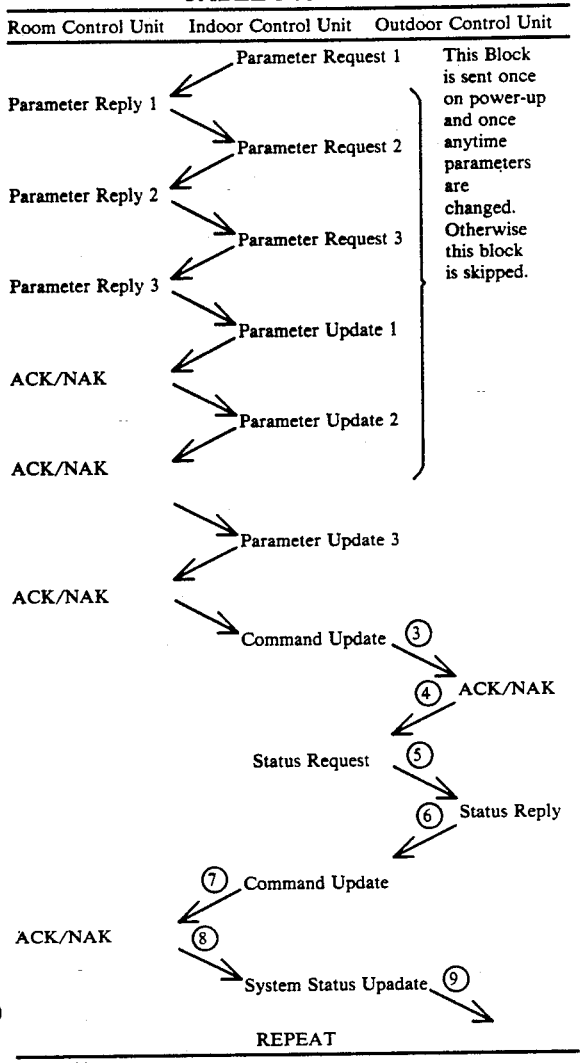

TABLE II

Enhanced Single Speed Message Format For Versions COPE1-27 And Above

| | Key | | | | | | | | | |
|---|---|---|---|---|---|---|---|---|---|---|
| From Indoor To Thermostat | 81①194 | 19 INV SPD | 5 OUT FAN MIN | 13 HR | 76 TEMP WHOLE | 176 TEMP FRACT | 76 SET PT | 64 STP HT NXT PRG TIME | 70 EEV POS NXT PRG ST PT | 0 BLWR SPD BLWR SPD | 0 DIAG MODE | 98 FLAG | 47 MANUAL MODE NORMAL MODE |
| From Thermostat to Indoor | 21②66 | 80 HUM SET PT | 70 HUM % | | | | | | | | | | 223 |
| From Indoor to Outdoor | 92③131 | 0 CONFG | 0 MODE | 0 INV FRQ | 0 FAN SPD | 0 | 0 | 0 | 0 | 0 | | 0 | |
| From Outdoor To Indoor | 197⁴6 | 203 (Acknowledge; Above Message Received Okay) | | | | | | | | | | | |
| From Indoor To Outdoor | 92⁵195 | 31 | | | | | | | | | | | |
| From Outdoor To Indoor | 197⑥67 | 0 MODE | 0 INV FRQ | 0 | 0 MALF | 0 SUCT TEMP | 115 DSCH TEMP +55 | 149 OTDR AMB -77 | 142 OTDR COIL1 -77 | 0 OTDR COIL2 | 0 OTDR CRNT | | 158 |
| From Indoor To T'Stat | 81⑦130 | 0 ST PT OVRIDE | | | | 0 FLAG | 0 DIAG | | | 0 | 0 COMP SPD | 149 OTDR AMB | 0 OTDR % HUM |
| From T'Stat To Indoor | 21⑧6 | 27 | | | | | | | | | | | |
| From Indoor | 80⑨129 | 0 | 0 EEV POS | 0 BLWR SPD | 0 STRP HT | 53 OUT PID | 15 PWM OFF TIME | 5 PWM ON TIME | 0 | 255 PID DER FLAG TERM | 0 | 25 |

Legend boxes:

128 BIT 7 MINUL MODE=1/NORM=0
64  6 PWR UP=0/KEY PRES=1
32  5 CMFT=1/ECON=0
16  4 PARAMETER SETUP=1
8   3 BLOWER ON=1
4   2 LOCKOUT OVRIDE=1
2   1 0 0 1 1 MODE
1   1 0 0 1 0 1 MODE
        OFF | | EMER
        COOL HEAT

64 BIT 6 MALFUNCTION
32  5 MODE ECHO
16  4 MODE ECHO
4   2 AUX HT
2   1 DEFROST
1   0 LOCKOUT

8 BIT 3 DIAGNOSTICS
4   2 DEFROST
2   1 RU COMM ERROR
1   0 OD COMM ERROR

TABLE III

| | |
|---|---|
| HUM SET PT | Humidity Set Point |
| HUM % | Measured Indoor Relative Humidity (times 2) |
| INV SPD | Inverter Speed (0 = off; 200 = on) |
| OUT FAN | Outdoor Fan Speed (0 = off; (100 = low; 200 = high) |
| STP HT | Number of Levels of Resistance Heat On |
| EEV POS | Electronic Expansion Valve Open Position |
| BLWR SPD | Indoor Blower Speed |
| CHECK SUM | Sum (modulo 256) of Numbers in Message |
| HR | Hour of Day |
| MIN | Minute of Day |
| TEMP WHOLE | Measured Room Temperature Whole Number |
| TEMP FRACT | Measured Room Temperature Fractional Part |
| SET PT | Thermostat Set Point |
| NXT PRG TIME | Next Programmed Set Point Change Time |
| NXT PRG ST PT | Next Programmed Set Point |
| BLWR SPD | Indoor Blower Speed in Fan ON Mode |
| DIAG MODE | Diagnostic Mode Number |
| MNUL MODE | Manual Mode |
| NORM | Normal Running Mode |
| PWR UP | Power Up |
| KEY PRES | Key Pressed |
| CMFT | Comfort Mode |
| ECON | Economy Mode |
| PARAMETER SETUP | Parameter Setup Mode |
| BLOWER ON | Blower in Fan ON Mode |
| LOCKOUT OVRIDE | Compressor Lockout Time Override |
| MODE | Off Cool Heat or Emer Operating Mode |
| CONFIG | Outdoor Configuration |
| MODE | Operating Mode of Outdoor Unit |
| INV FRQ | Inverter Frequency (Compressor ON or OFF) |
| MALF | Outdoor Malfunction Codes |
| SUCT TEMP | Suction Temperature |
| DSCH TEMP | Discharge Temperature |
| OTDR AMB | Outdoor Ambient Temperature |
| OTDR COIL1 | Outdoor Coil Temperature #1 |
| OTDR COIL2 | Outdoor Coil Temperature #2 |
| CRNT | Compressor Current |
| OTDR %HUM | Outdoor Percent Relative Humidity |
| ST PT OVRIDE | Set Point Override |
| DIAG | Diagnostic Mode Number |
| COMP SPD | Compressor Speed (ON/OFF) |
| OTDR AMB | Outdoor Ambient Temperature |
| OTDR %HUM | Outdoor Percent Relative Humidity |
| MALFUNCTION | System Operating Under a Malfunction |
| MODE ECHO | System Mode (Heat, etc.) Echoed to Thermostat |
| AUX HT | Resistance Strip Heat ON/OFF |
| DEFROST | Running Defrost Routine |
| LOCKOUT | Compressor in Lockout Time |
| EEV POS | Electronic Expansion Valve Open Position |
| BLWR SPD | Indoor Blower Speed |
| STRP HT | Number of Strip Heat Levels ON |
| OUT PID | PID Control Value |
| PWM OFF TIME | Minutes Strip Heat or Compressor OFF in Cycle |
| PWM ON TIME | Minutes Strip Heat or Compressor ON in Cycle |
| PID DER TERM | Value of Derivative Term of PID Value |
| DIAGNOSTICS | System in Diagnostics Mode |
| DEFROST | System in Defrost Mode |
| RU COMM ERROR | Communication Fault Between Indoor & Thermostat |
| OD COMM ERROR | Communication Fault Between Indoor & Outdoor |

Note:
In message 2 the top set of abbreviations describe the numbers shown when the system is in manual mode. The lower set of abbreviations describe the numbers in normal running mode.

What is claimed is:

1. An air-conditioning system comprising:
   a heat pumping means having an outdoor heat exchanger, an indoor heat exchanger and a compressor;
   an indoor fan for delivering air across said indoor heat exchanger for conditioning;
   an adjustable speed motor means coupled to said indoor fan for driving said fan at least two different speeds;
   first sensing means for measuring a parameter indicative of indoor air temperature;
   second sensing means for measuring a parameter indicative of indoor humidity;
   processor system coupled to said first and second sensing means and to said motor means having a comfort mode for selecting the speed of said indoor fan based on indoor air temperature and humidity and having an economy mode for selecting the speed of said indoor fan based on outdoor air temperature.

2. The air-conditioning system of claim 1 further comprising:
   mode selection means for selecting a COOLING mode in which heat is pumped from said indoor heat exchanger to said outdoor heat exchanger and a HEATING mode in which heat is pumped from said outdoor heat exchanger to said indoor heat exchanger; and
   wherein said processor system selects the indoor fan speed using a first fan speed-air temperature relationship in said COOLING mode and a second fan speed-air temperature relationship in said HEATING mode.

3. The air-conditioning system of claim 1 wherein said processor system includes means for storing at least one comfort envelope relationship and wherein in said comfort mode said indoor fan speed is determined at least in part based on said comfort envelope relationship.

* * * * *

UNITED STATES PATENT AND TRADEMARK OFFICE
CERTIFICATE OF CORRECTION

PATENT NO. : 5,303,561

DATED : April 19, 1994

INVENTOR(S) : Vijay Bahel; Hank Millet; Mickey Hickey; Hung Pham; Gregory P. Herroon It is certified that error appears in the above-identified patent and that said Letters Patent is hereby corrected as shown below:

Column 4, line 65, "This" should be -- Thus --.

Column 5, line 13, after "System" insert -- Components --.

Column 7, line 48, "and" should be -- an --.

Column 8, line 4, "prefered" should be -- preferred --.

Column 8, line 28, "may obtain" should be -- may be obtained --.

Column 10, line 48, "algorthm" should be -- algorithm --.

Column 11, line 11, "considerably" should be -- considerable --.

Column 11, line 32, "roughtly" should be -- roughly --.

Column 11, line 35, "comprimise" should be -- compromise --.

Column 12, line 1, "alogrithm" should be -- algorithm --.

Column 12, line 22, "alogrithm" should be -- algorithm --.

Column 15, in the box, line 1, "MINUL" should be -- MNUL --.

Column 15, line 14, "4" should be -- ④ --.

UNITED STATES PATENT AND TRADEMARK OFFICE
CERTIFICATE OF CORRECTION

PATENT NO. : 5,303,561                                          Page 2 of 2

DATED      : April 19, 1994

INVENTOR(S) : Vijay Bahel; Hank Millet; Mickey Hickey; Hung Pham;
              Gregory P. Herroon It is certified that error appears in the above-identified patent and that said Letters Patent is hereby corrected as shown below:

Column 15, line 16, "5" should be --  --.

Column 17, line 7, "(100" should be -- 100 --.

Signed and Sealed this

Seventh Day of February, 1995

Attest:

BRUCE LEHMAN

Attesting Officer          Commissioner of Patents and Trademarks